United States Patent Office

3,376,924
Patented Apr. 9, 1968

3,376,924
FOAM DRIVE FOR SECONDARY RECOVERY
Martin Felsenthal, John W. Quinn, and Claude L. Jacocks, Ponca City, Okla., assignors to Continental Oil Company, Ponca City, Okla., a corporation of Delaware
No Drawing. Filed Oct. 1, 1965, Ser. No. 492,321
6 Claims. (Cl. 166—9)

ABSTRACT OF THE DISCLOSURE

An improved foam-flooding gas-drive tertiary oil recovery process wherein the gas bubbles of the foam are alternately contracted and expanded by first shutting in production wells while injecting gas via injection wells and then shutting in injection wells while producing production wells.

---

This invention relates to a tertiary oil recovery process. More particularly, this invention relates to a process for the recovery of additional oil from an underground reservoir upon which primary and/or secondary recovery operations have been carried out.

Following the completion of one or more wells piercing a subterranean reservoir, oil is normally recovered through these wells first by utilization of natural reservoir energy which may exist in several forms including gas and water drives. The methods of oil recovery which employ natural reservoir energy generally are referred to as primary recovery. After primary recovery becomes uneconomical or the natural reservoir energy becomes substantially depleted, a substantial amount of oil remains in the reservoir. At this time, it is common practice to employ secondary recovery methods utilizing energy supplied from an external source to remove additional oil. The secondary recovery methods most widely used to date are those in which a fluid is introduced into the reservoir through one or more injection wells in order to displace the oil toward one or more production wells from which it may be recovered. Fluids which have been employed in this manner include water, brine, air, natural gas, carbon dioxide, petroleum gases or liquids and the like. Although secondary recovery methods often remove a substantial amount of oil in addition to that produced by primary recovery means, a large amount of oil is generally still left in the reservoir. Recovery methods employed following secondary recovery are referred to as tertiary recovery methods.

One of the major reasons for the inability of secondary recovery methods to remove substantially all the oil remaining in the reservoir is the bypassing of large amounts of oil by the injected fluid fingering through the matrix. This failure to sweep out more oil is due, at least in part, to the inhomogeneity of the reservoir rock. An injected fluid follows the path of least resistance through the formation, i.e., tends to flow through only the large pores. This tendency to bypass oil is increased even further by the substantial differences in the viscosity of the injected fluids which is generally relatively low and the viscosity of the oil which is generally relatively high.

Various methods have been proposed to improve areal sweeps of the injected secondary recovery fluids. Additives are known which increase the viscosity of liquid flooding media. However, since large amounts of fluid are involved, this process proves to be costly. Various combinations of slugs of gaseous and liquid flooding media have been proposed. Substantial amounts of oil remain in the formation following the use of such techniques. It has also been proposed to inject a foaming agent into partially depleted oil-bearing reservoirs, and follow with a gas drive. The foaming agent may be used alone or as an aqueous solution.

A stable gas-in-water dispersion or foam is formed in the reservoir ahead of the major portion of the gas driving flood. This foam front greatly reduces the mobility of the gas phase and thus increases the oil-displacing ability of the injected gas. The instant invention involves an improvement of the recovery process employing foam.

Accordingly, it is an object of this invention to increase the amount of oil recovered from a subterranean oil-bearing reservoir. It is a further object to provide an improved type of displacement process for reservoirs having heterogeneous permeability and porosity. It is another object to provide a method for recovering additional quantities of oil from reservoirs which have been subjected to conventional waterflood to the economic limit of oil recovery by that method. These and related objects which will be expressly discussed are readily apparent from the following description and appended claims are realized in accordance with the following invention.

Briefly, this invention involves a process for recovering oil from a reservoir penetrated by at least one injection well and at least one production well. Production from the reservoir is carried to the economic limit of primary recovery means and of secondary recovery means. Next, a slug of foaming agent, either alone or in aqueous solution, is injected into the injection well. The foaming agent is followed by a gas drive. A foam bank or front is created by the mixing of the foaming agent with the contiguous portion of the injected gas and any gas already present in the reservoir. The gas drive is continued until the gas-oil ratio becomes uneconomically high. At this point, all production wells are shut in and gas injection via the injection wells is continued until the formation pressure at the production well approximately equals the formation pressure at the injection well. Next, the gas injection is stopped and the production well opened to production. This buildup and subsequent release of pressure in the reservoir appears to have a spring-like compression and expansion effect on the foam in the reservoir which results in the displacement of additional oil not otherwise recoverable or recoverable only with prolonged additional flooding.

As stated above, use of foam for secondary recovery operations is known in the art. Suitable foaming agents are likewise well known. Any foaming agent may be used which will create a foam when formation brine or injected water containing such foaming agent contacts and mixes with formation or injected gas under reservoir conditions. Illustrative of suitable foaming agents are various water-soluble surface-active agents, such as:

A. NONIONIC

I. Products obtained by autocondensation of various fatty matter and their derivatives with ethylene oxide, propylene oxide, glycols, or glycerols:
  (a) a fatty acid plus ethylene oxide or glycerol, such as palmitic acid plus 5 moles ethylene oxide or glycerol monostearate;
  (b) an alcohol plus ethylene oxide, such as hydroabietyl alcohol plus 15 moles ethylene oxide;
  (c) an ester or aldehyde plus ethylene oxide;
  (d) an amide or amine plus ethylene oxide, such as diethanolamine plus 15 moles ethylene oxide.
II. Products obtained by condensation of phenolic compounds having lateral chains with ethylene or propylene oxide. Examples are disecbutyl phenol plus 10 moles ethylene oxide and octyl phenol plus 12 moles ethylene oxide.

B. CATIONIC

I. Neutralization product of primary, secondary or tertiary amine with an acid such as trimethyl octyl ammonium chlorides, lauryl dimethyl benzyl ammonium chloride and the like, commonly referred to as quaternary ammonium chlorides.

C. ANIONIC

I. Alkyl aryl sulfonates such as ammonium isopropyl benzene sulfonate;
II. Fatty alcohol sulfates such as sodium 2 - methyl - 7 - ethyl - 4 - hendecyl sulfate;
III. Sulfated and sulfonated amides and amines such as sodium N - methyl - N - oleyl taurate;
IV. Sulfated and sulfonated esters and ethers such as dioctyl sodium sulfo succinate;
V. Alkyl sulfonates such as sodium dodecyl sulfonate.

D. AMPHOLYTIC

I. Molecules where the molecule as a whole forms a zwitterion, such as cetylaminoacetic acid.

A reference book which describes many types of surfactants suitable as foaming agents is "Surface Active Agents and Detergents," Volumes I and II, by Schwartz et al., Interscience Publishers.

Especially suitable foaming agents are compounds of the formula $$RNH_m-(A-COOX)_n$$

in which R is an aliphatic hydrocarbon group having 8 to 22 carbon atoms, A is a divalent hydrocarbon radical having 1 to 6 carbon atoms, X is a member selected from the group consisting of hydrogen, alkali metal and amine, $n$ is an integer of 1 to 2, and $m$ is an integer of 0 to 1 and the sum and $m$ and $n$ is 2.

Another excellent foaming agent is composed of 50 percent by weight ammonium salt of sulfated ethoxylated n - decanol containing about 40 percent ethylene oxide based on the alcohol, 15 percent isopropanol and 35 percent water as described in copending U.S. Ser. No. 313,- 789, now abandoned, hereinafter referred to as Foaming Agent A. Still another preferred foaming agent is the condensation product of octyl phenol with 10 moles ethylene oxide.

As stated previously, the foaming agent may be injected into the formation alone, with the water constituent of the foam coming from connate water or other water present in the formation. However, it is generally preferred to employ an aqueous solution of the foaming agent which is of lower viscosity and hence easier to inject than the concentrated foaming agent. Also such a solution is more economical to use and gives adequate foaming. The concentration of the foaming agent in water may be as low as about 0.5 percent by weight. Generally, more than about 5.0 percent foaming agent is of little advantage, although more concentrated solutions are not harmful. Fresh water may be used, but it is generally preferred to use a brine, such as brine previously removed from the formation being treated or a synthetic brine, in order to decrease formation damage.

The foaming agent is followed by gas injection. Suitable gases include air, nitrogen, carbon dioxide, natural gas, exhaust gases from internal combustion engines, flue gases, and the like. The gas contacts the previously injected foaming agent and creates a foam bank therewith which proceeds through the formation driving natural formation fluids before it toward a production well. Gas injection is continued until the gas/oil ratio of the production well or wells becomes uneconomically high, e.g., in the order of 100/1 to about 20,000/1 at bottom hole conditions. This rather wide range is due to the wide variations in types of oil which are produced.

The above portion of the procedure describes how foam drives have been conducted in the past. With wells treated in this manner, continued injection of gas with or without passing additional slugs of foaming agent through the formation results in the production of only a slight additional amount of oil. The cost of such continued operations makes the recovery of this additional oil uneconomical.

The inventors have discovered a unique and novel continuation of this foam drive treatment which produces a surprisingly larger additional amount of oil. This procedure consists of shutting in the producing well having a high gas/oil ratio in the order of 100/1 up to about 20,000/1 while maintaining gas injection into the injection well. Such conditions are maintained until the reservoir pressure at the production well approximately equals that at the injection well. At this time, the injection well is shut in and the production well opened and allowed to flow until production becomes uneconomically low.

The exact reasons why the novel process of this invention results in additional oil recovery are not entirely clear. It is believed that when the pressure throughout the foam-containing reservoir is equalized, the individual foam bubbles are compressed and thus better able to enter the small sized pores previously bypassed and displace oil therefrom. This oil passes into the larger pores or channels and is free to move to the production well when the latter is opened up. Also the rate of movement of foam bubbles through the formation changes while the pressure is being equalized. Movement of bubbles into the smaller pores due to the compressive force becomes relatively greater than movement of bubbles laterally through the larger oil-free pores due to the pushing force of additional injected gas. Thus, more oil is freed per unit volume of gas passing through the reservoir. When the production well is subsequently opened without further gas injection into the reservoir, the foam bubbles expand, thus exerting a force in all directions to push against and displace any contiguous oil.

Examples 1 to 3

A 2-inch by 24-inch by 24-inch rectangular slab of Berea sandstone having a permeability of from 150 to 200 millidarcies was used as a miniature reservoir for laboratory tests to illustrate the practice of this invention. A five-spot well pattern was simulated by drilling a ¼ inch diameter hole to a depth of 1¾ inches into the center of one of the faces of the slab having the largest surface area. Four other holes were similarly drilled in the same face, one each 1-inch inwardly from each of the four corners of the slab. This five-spot pattern approximates the common 40-acre well spacing scaled down by a factor of about 1,000. Each hole was reamed to a diameter of 11/32 inch and a depth of ¼ inch to allow for the insertion therein of pipe fittings for passage of fluids. After attaching the fittings, the slab was entirely coated with an epoxy resin. The coated slab was placed in a bomb and completely saturated with sodium chloride brine. A pressure of 400 p.s.i. was then applied to the outside of the slab with additional water. Approximately 1000 ml. additional water was flowed through the four corner wells to remove additional air not previously displaced. Two pore volumes of various oils described below were flowed into the four corner wells and out the center well. At the end of this time very little additional water was being displaced.

In the following tests all injection of fluids was in the four corner wells and all production was through the center well. A waterflood was carried out by injecting brine composed of water containing 50,000 p.p.m. sodium chloride and 10 p.p.m. mercuric chloride until the water/oil ratio became high. A gas drive was then carried out by injecting nitrogen at 300 p.s.i. inlet pressure and 0 p.s.i. outlet pressure until the gas/oil ratio reached about 100/1. Next, 380 cc. brine containing 3.8 cc. Foaming Agent A immediately followed by nitrogen gas at 200 p.s.i. inlet pressure and 0 p.s.i. outlet pressure were injected. Injection of nitrogen was continued until the gas/oil ratio reached about 100/1. This phase of the procedure represented the known foam drive secondary recovery technique. Next, the production well was shut in and the same nitrogen pressure of 200 p.s.i. maintained for 1.5 hours. Thereafter, the nitrogen injection was stopped and the production well opened to the atmosphere. The last four steps, i.e., injection of foaming agent, solution injection of nitrogen, shutting in production well and stopping injection of nitrogen while opening the production well were each repeated two additional times. Production of oil in each of the above steps is given below. Oils used included 80 pale oil and a blend of 40 pale oil and 95 VI bright stock. Pale oil is a solvent refined Mid-Continent oil. 80 pale oil has a viscosity of 80 SSU at 100° F. 40 pale oil has a viscosity of 40 SSU at 100° F. Bright stock is a lubricating oil of high viscosity, 95 viscosity index in this instance, obtained from residues of petroleum distillation by dewaxing and treatment with fuller's earth or a similar material.

| Oil | Examples | | |
|---|---|---|---|
| | 1 | 2 | 3 |
| | Blend of Equal Vol. of 40 Pale Oil and 95 VI Bright Stock | 80 Pale Oil | Kerosene |
| Oil viscosity (cps.) | 440 | 23 | 1.5 |
| Brine viscosity (cps.) | 1 | 1 | 1 |
| Porosity (percent) | 16.9 | 20.1 | 20.2 |
| Initial water saturation (percent pore space) | 26.2 | 22.5 | 38.8 |
| Initial oil saturation (percent pore space) | 78.0 | 77.5 | 61.2 |
| Oil Recovery (Percent Oil Initially in Place): | | | |
| (a) Waterflood | 32.8 | 43.6 | 39.0 |
| (b) Gas drive | 34.4 | 53.5 | (¹) |
| (c) First foam drive | 35.8 | 55.9 | 48.3 |
| (d) First pressure equalization and production | 37.7 | 61.9 | (¹) |
| (e) Second foam drive | 37.9 | 62.9 | 57.6 |
| (f) Second pressure equalization and production | 40.0 | 64.4 | 61.0 |
| (g) Third foam drive | 40.2 | 65.4 | 61.9 |
| (h) Third pressure equalization and production | 41.8 | 66.4 | 62.0 |

¹ Not measured.

These results show that generally more oil is produced by equalizing the pressure and then opening the producing well while allowing the pressure to drop, than by the preceding foam drive step. The results are especially striking with the higher viscosity oils which are more characteristic of many crude oils.

It is apparent that many modifications and variations of the invention hereinbefore set forth may be made without departing from the spirit and scope thereof. The examples given are by way of illustration only and the invention is limited only by the terms of the appended claims. Throughout the description for simplicity reference has been made to an injection well and a producing well. It is to be understood that in actual practice there may be a plurality of either injection wells or producing wells, or both.

We claim:
1. A process for the recovery of liquid hydrocarbons from a hydrocarbon-containing formation penetrated by at least one injection well and at least one production well comprising:
   (a) foam flooding said hydrocarbon-containing formation until the produced gas/oil ratio becomes uneconomically high,
   (b) injecting gas into the injection well while closing in the production well until the formation pressure at the production well approximately equals the formation pressure at the injection well, and
   (c) ceasing the gas injection into the injection well while producing fluids from the production well.

2. The process of claim 1 wherein the foam flooding is carried out using an aqueous solution of a foaming agent.

3. A process for the recovery of liquid hydrocarbons from a hydrocarbon-containing formation penetrated by at least one injection well and at least one production well comprising:
   (a) injecting a liquid foaming agent into the injection well,
   (b) injecting a gas flooding medium into the injection well until the produced gas/oil ratio becomes uneconomically high,
   (c) injecting gas into the injection well while closing in the production well until the formation pressure at the production well approximately equals the formation pressure at the injection well, and
   (d) ceasing the gas injection into the injection well while producing fluids from the production well.

4. The process of claim 3 wherein the liquid foaming agent is employed in an aqueous solution.

5. In an oil recovery process wherein a foaming agent-containing aqueous driving fluid followed by gas is injected into a subterranean oil-bearing reservoir through an injection well to displace hydrocarbons toward a production well until the produced gas/oil ratio becomes uneconomically high and hydrocarbons not displaced from sections of said reservoir through which said driving fluid passes remain in place as residual hydrocarbons at the conclusion of said process, the improvement which comprises:
   (a) injecting further amounts of gas into the injection well while shutting in the production well until the reservoir pressure at the injection well and production well are approximately equal, and
   (b) ceasing injection of gas while opening the production well.

6. A method of displacing additional oil from a subterranean formation penetrated by at least one injection well and at least one production well following foam flooding of said formation to a gas/oil ratio of from 100/1 to 20,000/1 comprising:
   (a) shutting in the production well and injecting gas into the injection well to compress the foam bubbles present in the formation and move said foam bubbles into the less permeable sections of the formation, and
   (b) shutting in the injection well and opening the production well to expand the foam bubbles and move the same toward the production well.

References Cited

UNITED STATES PATENTS

| 2,866,507 | 12/1958 | Bond et al. | 166—9 |
| 3,177,939 | 4/1965 | Holm et al. | 166—9 |
| 3,185,634 | 5/1965 | Craig et al. | 166—9 |
| 3,196,944 | 7/1965 | Bernard et al. | 166—9 |
| 3,269,460 | 8/1966 | Hardy et al. | 166—10 |
| 3,311,167 | 3/1967 | O'Brien et al. | 166—9 |
| 3,318,379 | 5/1967 | Bond et al. | 166—9 |

OTHER REFERENCES

Uren, Petroleum Production Engineering-Exploitation, Third Edition, McGraw-Hill Book Co., Inc., New York, 1953 (pp. 492–504).

STEPHEN J. NOVOSAD, *Primary Examiner.*